United States Patent [19]

Landy

[11] Patent Number: 4,885,829
[45] Date of Patent: Dec. 12, 1989

[54] FATIGUE LIFE ENHANCEMENT OF DOVETAIL CONNECTOR SLOTS AND NONCIRCULAR OPENINGS

[75] Inventor: Michael A. Landy, Bellevue, Wash.
[73] Assignee: Fatigue Technology, Incorporated, Seattle, Wash.
[21] Appl. No.: 312,593
[22] Filed: Feb. 16, 1989
[51] Int. Cl.[4] ............... B21K 3/04; B23P 15/02; B23P 13/04
[52] U.S. Cl. ............... 29/156.8 R; 29/558; 72/370; 408/1 R
[58] Field of Search ............... 29/557, 558, 156.8 R; 408/1 R; 72/370, 476, 391

[56] References Cited

U.S. PATENT DOCUMENTS

| | | | |
|---|---|---|---|
| 1,614,558 | 1/1927 | Kasley | 29/558 UX |
| 1,758,235 | 5/1930 | Nash | 29/557 X |
| 2,334,855 | 11/1943 | Zinkil | 408/1 R |
| 2,431,249 | 11/1947 | Heppner | 29/156.8 R |
| 2,670,639 | 3/1954 | Flowers et al. | 29/557 UX |
| 2,781,998 | 2/1957 | Barr | 29/156.8 R X |
| 3,045,329 | 7/1962 | Carli et al. | 29/156.8 R |
| 3,137,938 | 6/1964 | Arrighini | 29/558 |
| 3,566,662 | 3/1971 | Champoux | 72/370 |
| 4,129,028 | 12/1978 | Leftheris et al. | 72/370 X |
| 4,457,059 | 7/1984 | Alorio et al. | 72/370 X |

FOREIGN PATENT DOCUMENTS

| | | | |
|---|---|---|---|
| 319489 | 3/1920 | Fed. Rep. of Germany | 29/557 |
| 900740 | 7/1962 | United Kingdom | 29/525 |

Primary Examiner—Charlie T. Moon
Attorney, Agent, or Firm—Delbert J. Bernard

[57] ABSTRACT

A pair of openings (14) are drilled in a workpiece (12) at locations spaced inwardly from an edge (76) of the workpiece (12). Each opening is cold-expanded by the passage of a mandrel (46') only, or a mandrel (46) and split sleeve (58), to create an annular zone of residual compressive stresses (72) in the workpiece material immediately surrounding the openings (14'). Then the workpiece (12) is cut along lines extending from the edge (76) inwardly to central regions of the cold-expanded openings (14'). The workpiece material between the two openings (14') and the two cuts (74) is removed. The edge portions (72) of the material in the vicinity of the cuts (74) and the openings (14') are machined to a final desired size and shape, to define connector slots (84) having cold-expanded round regions bounding the slots (84).

12 Claims, 3 Drawing Sheets

FATIGUE LIFE ENHANCEMENT OF DOVETAIL CONNECTOR SLOTS AND NONCIRCULAR OPENINGS

TECHNICAL FIELD

This invention relates to the manufacture of machine or product components of a type including dovetail connector slots or noncircular openings. More particularly, it relates to a method of enhancing the fatigue life of the component material which immediately bound portions of such slots or openings.

BACKGROUND ART

Most structural components include stress concentrations at notches, fillets, slots, radii cutouts and holes in the component material. The fatigue and crack growth life of holes can be significantly improved by cold-expanding the material immediately bounding the holes. Typical tooling and techniques for cold-expanding circular openings are disclosed, for example, in U.S. Pat. No. 4,557,033, granted Dec. 10, 1985, to Robert L. Champoux. Life-enhancement techniques for noncircular stress concentrations have been traditionally limited to surface treatments such as shot peening, roller burnishing, coining, etc. These methods create relatively shallow zones of residual compressive stresses, are often sensible to manufacturing variables, and are dependent on the proficiency of the operator. The cold-expansion process, involving the pulling of a cold-expansion mandrel through a circular opening, either alone or through a cold-expansion sleeve positioned in the opening, is known to be a reliable and effective method of material life enhancement. It is insensitive to manufacturing variables. Also it is independent of operator proficiency.

The principal object of this invention is to use a mandrel only cold-expansion technique, or a mandrel and sleeve cold-expansion technique, for life enhancement of dovetail connector slots.

DISCLOSURE OF THE INVENTION

In accordance with the invention, a dovetail connector slot is formed in a workpiece in the following manner. A pair (or a plurality) of spaced-apart openings are drilled in the workpiece at locations spaced about equal distances inwardly from an edge of the workpiece. Then, the workpiece material immediately surrounding the openings is cold-expanded by passing a cold-expansion mandrel through each opening. A mandrel alone (solid or split mandrel) may be used or a tubular cold-expansion sleeve may be placed in the opening and the mandrel then passed through the sleeve. Following cold-expansion of the two openings, the workpiece is cut along lines extending inwardly from the edge to central regions of the openings. Then the region of the workpiece material between the two cuts and the openings is removed. Simultaneously with or immediately following the removal of the material, the edge portions of the material in the vicinity of the cuts in the openings is machined to a final desired size and shape but the cold-expanded regions bounding the slots are retained.

According to an aspect of the invention, the dovetail slots can be formed in the peripheral portion of a rotor, e.g. a compressor rotor or a turbine rotor. The described procedure is used at each location where a blade is to be attached to the rotor. The rotor may be further machined to its finished size and shape following the making of the connector slots.

The method of the invention can also be used to provide life enhancement of closed noncircular openings. Other objects, features and advantages of the invention are hereinafter described as a part of the description of the best mode.

BRIEF DESCRIPTION OF THE DRAWING

In the drawing, like reference numerals are used to designate like parts throughout the several views, and.

BEST MODE FOR CARRYING OUT THE INVENTION

Figure 1:
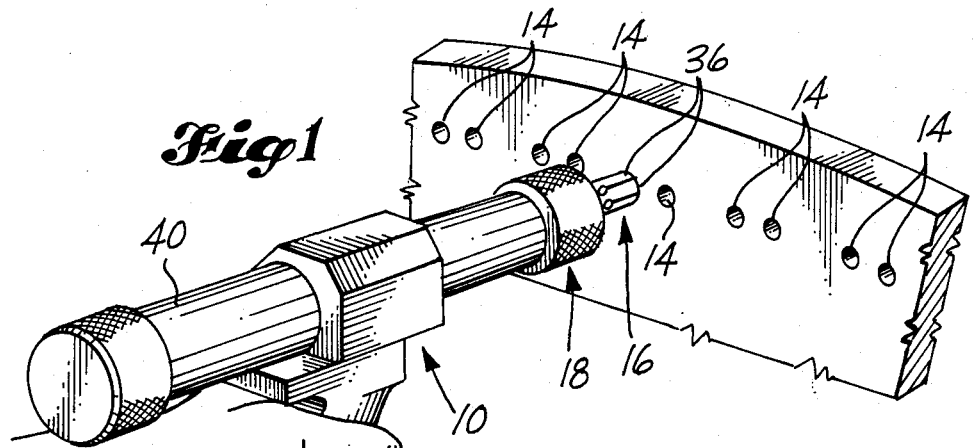
FIG. 1 is a pictorial view of cold-expansion tooling being used to pull a mandrel through an opening in a workpiece, to cold-expand the workpiece material immediately surrounding the opening.
Figure 3:
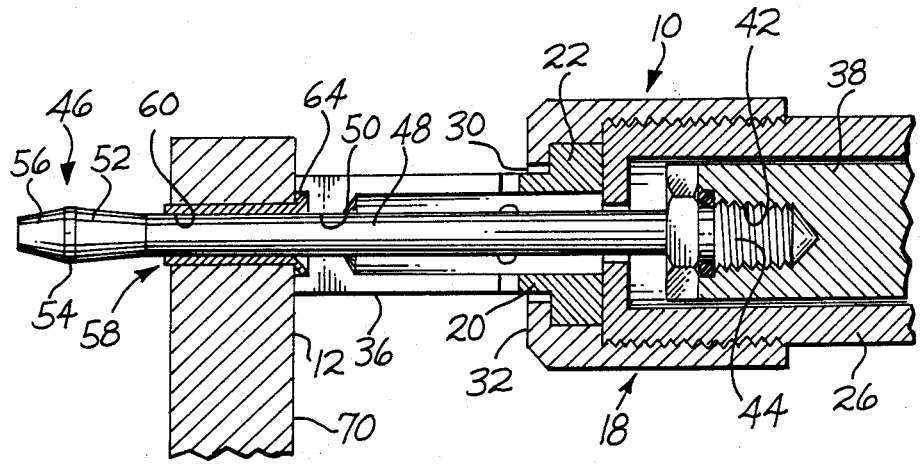
FIG. 3 is a longitudinal sectional view through the nose cap end of a puller gun, showing a cold-expansion sleeve positioned on an intermediate portion of the cold-expansion mandrel, and showing the nose piece of the puller gun positioned against one side of the workpiece and one end of the sleeve, and showing increasing diameter and maximum diameter portions of the mandrel positioned endwise of the sleeve on the side of the workpiece opposite the puller gun.
Figure 4:
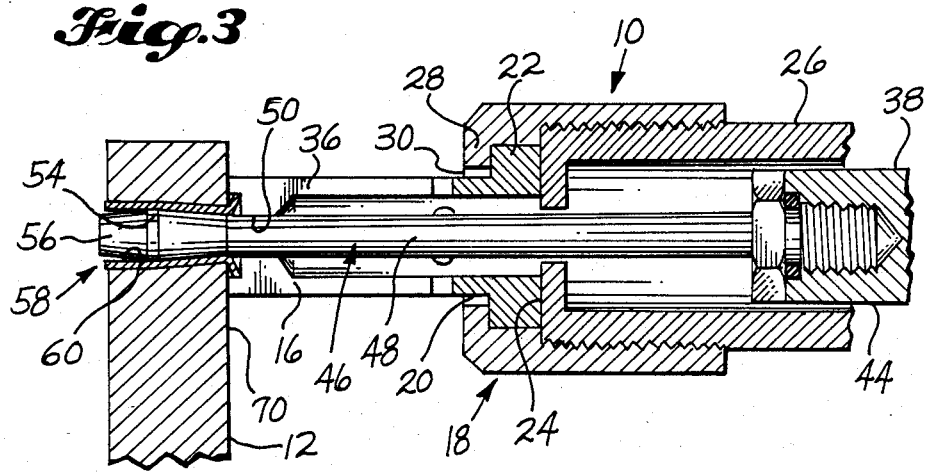
FIG. 4 is a view like FIG. 3, but showing the nose piece holding the sleeve within the opening while the increasing and maximum diameter portions of the mandrel are being pulled through the sleeve for expanding the sleeve radially to cold-expand the material immediately surrounding the opening.

FIG. 1 shows a puller gun 10 in the process of cold-working the material of a workpiece 12 immediately surrounding a drilled opening 14. The puller gun 10 includes a forward nose piece 16 which projects forwardly from an end cap 18. The nose piece 16 has a cylindrical rear portion 20 which includes a base flange 22 (FIGS. 3 and 4). The flange 22 is positioned within the nose cap 16, axially between an end surface 24 of puller gun barrel 26 and a forward end flange 28 on the nose piece 18. The nose piece 16 projects forwardly from its base 22 through an opening 30 in the forward wall 32 of the nose cap 18. The projecting portion of the nose piece 16 is longitudinally split at locations 34, so as to define a plurality of axially elongated segments 36 between the splits 34. A reciprocating member 38 is located within the barrel 26 and is alternately pushed forwardly and pulled rearwardly by a hydraulic cylinder 40 housed in the rear portion of the puller gun 10. A threaded axial socket 42 is formed in the forward end of member 38. The threaded base 44 of a mandrel 46 is threaded into the socket 42 to in that manner removably secure the mandrel 46 to the member 38.

Figure 2:
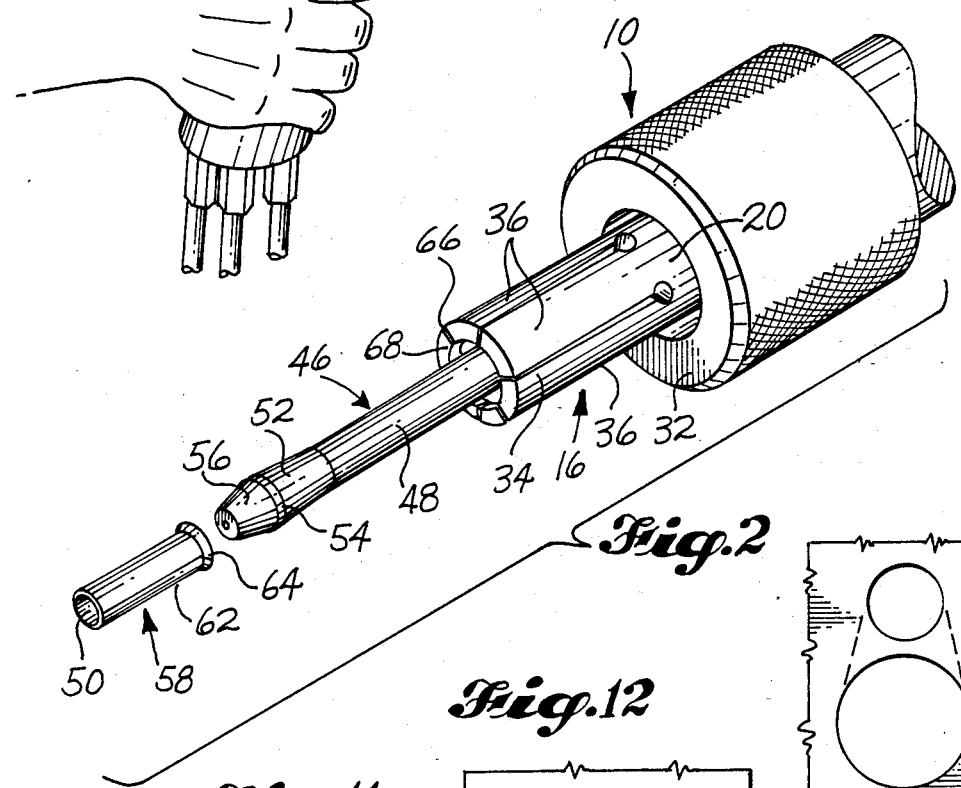
FIG. 2 is an enlarged scale pictorial view of a nose cap end of a puller gun, showing a cold-expansion mandrel installed in the puller gun and a cold-expansion tubular sleeve spaced endwise of the mandrel.
Figure 11:
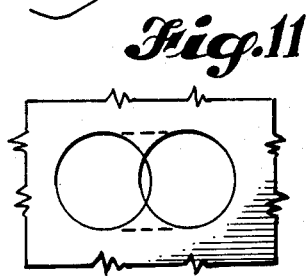
FIGS. 10–12 are elevational views depicting use of the method to cold-expand portions of noncircular closed openings.
Figure 12:
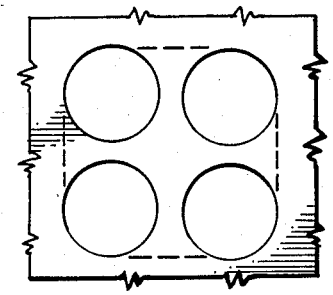
Figure 10:
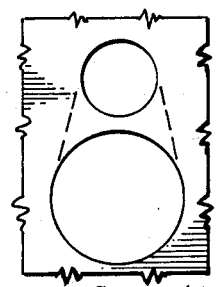
Figure 5:
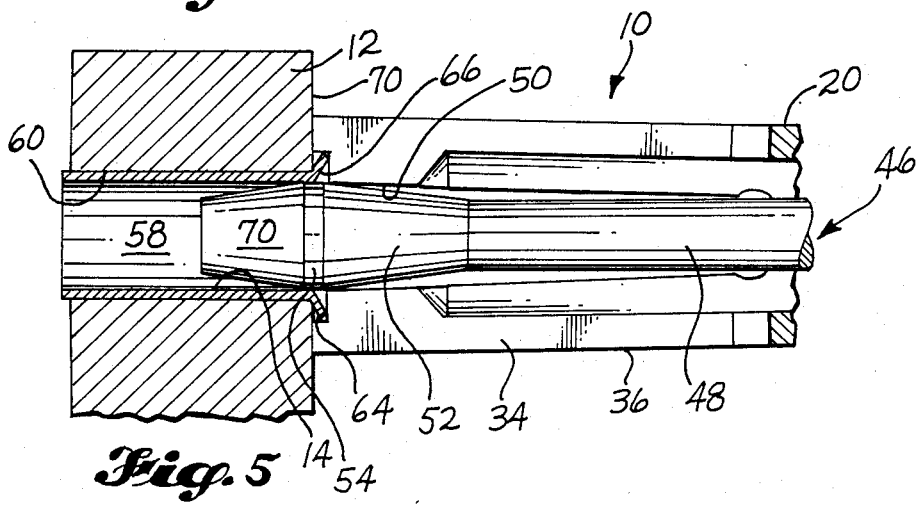
FIG. 5 is an enlarged scale sectional view through the nosepiece region of the tooling, substantially at the end of a cold-expansion step.

As best shown by FIG. 2, the mandrel 46 has a reduced diameter intermediate portion 48 that is sized to fit snugly within an opening 50 (FIGS. 3–5) in the forward portion of the nose piece 16. Mandrel 46 includes an increasing diameter portion 52 axially forward of portion 48 and a constant diameter portion 54 axially forwardly of increasing diameter portion 52. Mandrel 46 also includes a tapered forward end 56. In preferred form, the mandrel 46 is used in conjunction with an axially split cold working sleeve 58 which may be formed by curling a piece of sheet metal 60 on itself to form a near cylinder which is axially split at 62. A flared base end may be formed on the sleeve 58. A method of making this type of sleeve is disclosed by U.S. Pat. No. 3,665,744, granted May 30, 1972, to Clair M. Harter. As best shown by FIG. 5, a recess or well is formed at the forward end of the nose piece 16, immediately surrounding the opening 50. The base 64 of the sleeve 58 is received within recess 66. The flared base 64 also provides a flared entry into the sleeve 58 for the tapered end 56 of the mandrel 46.

A coldworking sleeve 58 is used for coldworking each opening 14. The tapered nose 56 of the mandrel 46 is moved endwise through the flared end of the sleeve 58. The longitudinal split 62 allows the sleeve member 60 to uncurl and expand radially to allow the sleeve 58 to accommodate the maximum diameter portion 54 and the increasing diameter portion 52 of the mandrel 56. The sleeve 58 is moved endwise along the mandrel 46 until it is positioned on the reduced diameter intermediate portion 48. When so positioned the sleeve member 60 contracts about the mandrel portion 48. This gives the sleeve 58 an outside diameter which is slightly smaller than the diameter of the opening 14 in workpiece 12.

The mandrel 56 and sleeve 58 are then moved endwise through an opening 14, into the start position shown by FIG. 3. This places the forward end surface 68 of nose piece 16 against the confronting surface 70 of workpiece 12 immediately surrounding the opening 14 which is to be coldworked. Then, the puller gun 10 is operated to pull the mandrel 46 rearwardly through the sleeve 58. The reaction of the pull is taken by the contact between the nose piece 16 and the workpiece 12. The contact of the sleeve base 64 with the nose piece 16 within the recess 66 holds the sleeve 58 within the opening 14 while the mandrel 46 is moving rearwardly through the sleeve. As shown by FIGS. 4 and 5, as the mandrel 46 retracts its increasing diameter portion 52 and then its maximum diameter portion 54 are pulled through the sleeve 58. The sleeve 58 is preferably internally lubricated to allow the sliding of the mandrel portions 52, 54 through it. The movement of the mandrel portions 52, 54 through the sleeve 58 causes a radial expansion of the sleeve 56. This expansion displaces the workpiece material which immediately surrounds the opening 14 radially outwardly and creates a cylindrical zone of residual compressive stresses in the material. It is this working of the material immediately surrounding the opening which provides fatigue life enhancement of the material.

As shown by FIG. 5, during the final retraction of mandrel 46, the increasing diameter portion 52 moves into the opening 50 in the nose piece 60. In response, the nose piece segments 36 spring radially outwardly. Following movement of the mandrel maximum diameter portion 54 all the way through sleeve 58, the puller gun 10 is pulled back away from the workpiece 12 and the sleeve 58 is removed from the opening 14. A new sleeve 58 is installed onto the mandrel 46 and the procedure is repeated with the next opening 14 to be coldworked and so on until all openings 14 have been coldworked.

Figure 9:
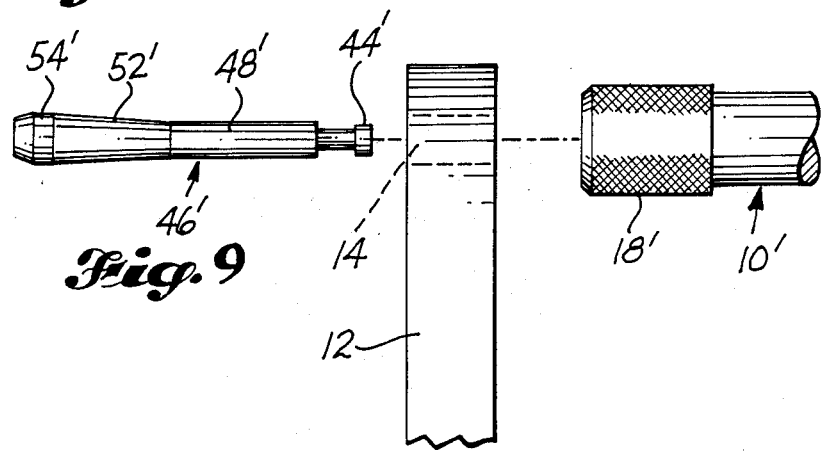
FIG. 9 is an exploded side elevational view of tooling used to cold-expand by use of a mandrel only.

A mandrel only technique can also be used for coldworking the hole 14. As shown by FIG. 9, a typical mandrel only technique utilizes a puller gun 10' and a solid mandrel 46'. In the above described sleeve/mandrel technique, the maximum diameter portion 52 of the mandrel 48 is smaller in diameter than the opening 14. As a result, the mandrel and sleeve can be inserted into the opening 14 from the puller gun side of the opening 14. The mandrel 46' used in practicing the mandrel only technique must have a maximum diameter portion 54' which is larger in diameter than the drill opening 14. As a result, it is necessary that access be had to the side of the workpiece 12 opposite the puller gun 10' so that the secured end 44' of the mandrel 46' can be inserted through the drilled opening 14 and then into the nose cap 18' of the puller gun 10'. Within the nose cap 18' the end member 44' is coupled to a reciprocating member which is in turn coupled to the extend/retract cylinder. Following connection of the mandrel 46' to the puller portion of the puller gun 10', the puller gun 10' is operated to pull the mandrel 46' through the opening 14. The increasing diameter and maximum diameter portions 52', 54' of the mandrel 46' are lubricated to allow them to slide through the opening 14. As mandrel portions 52', 54' move successfully through the opening 14, they expand the metal radially and in this manner create an annular zone of residual compressive stresses in the workpiece material immediately surrounding the opening 14. Split mandrel techniques are also known and can be used.

Figure 6:
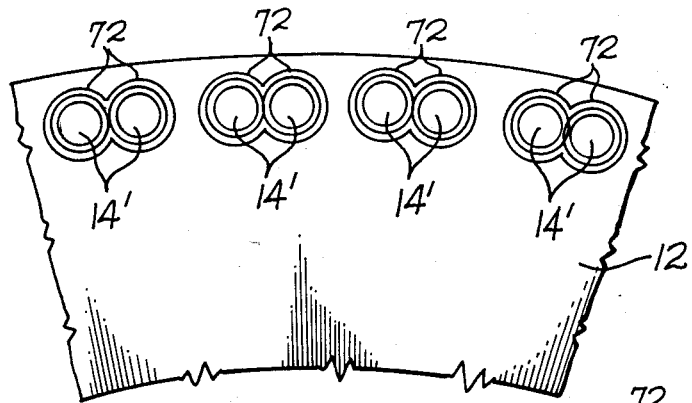
FIG. 6 is a fragmentary side elevational view looking towards a peripheral portion of a rotor, showing a pair of cold-expanded openings at each location where a blade is to be attached to the rotor.

The workpiece 12 shown in FIG. 1 is a fragmentary portion of a compressor disk blank. According to the present invention, a pair of openings 14 are drilled at each location where a dovetail connector slot is to be formed for connecting the blade route to the disk. Then, the drilled openings 14' are cold expanded in the manner described for creating annular zones of residual compressive stresses within the disk material surrounding the openings 14. In FIG. 6 the coldworked openings are designated 14' and the annular zones of residual compressive stresses are indicated by concentric circles designated 72.

Figure 7:
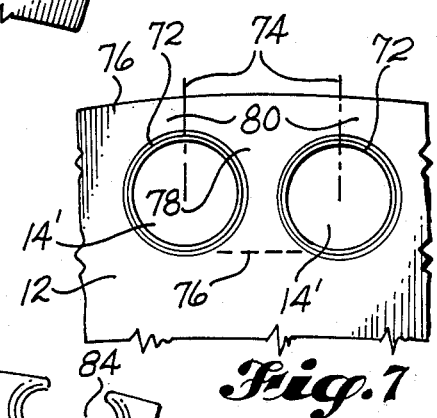
FIG. 7 is an enlarged scale view of one pair of the cold-expanded openings, such view showing the location of cuts that will be made for removing material between the two openings to define a dovetail connector slot.
Figure 8:
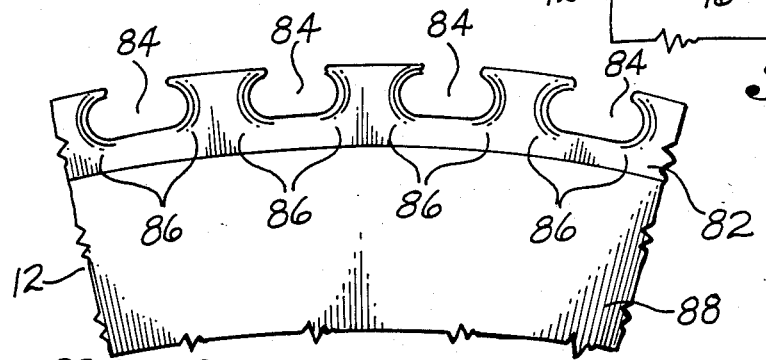
FIG. 8 is a view like FIG. 6, but showing a fragment of a finished rotor.

FIG. 7 is an enlarged scale fragmentary view in the region of a pair of the openings 14'. Lines 74 in this view are cut lines extending radially inwardly from workpiece edge 76 to central regions of the cold expanded openings 14'. The material is cut along these lines and also along a cut line 76 which extends between base portions of the openings 14'. This cutting removes a generally T-shaped piece of material 78 and leaves a pair of confronting projections 80. These projections are machined and the outer diameter of the disk 12 is sized and the disk is otherwise machined to form a disk having a peripheral portion 82 which includes a plurality of dovetail slots 84. Fatigue life enhancing residual compressive stresses remain in the regions 86, following the machining. This provides substantial fatigue life enhancement of the material immediately bounding the slots 84. The machining of the compressor disk may include thinning the disk in region 88, radially inwardly of the peripheral portion 82 which carries the connector slots 84.

Although the invention has been described in reference to the formation of connector slots in a compressor disk, it is to be understood that it has application wherever a slot or noncircular opening can be formed by drilling a grouping of two or more circular openings, then cold working such drilled openings, and then cutting away material between the openings to define a large noncircular opening which is in part defined by material which includes residual compressive stresses placed in it by the coldworking of the circular drilled openings. It is also to be understood that the technique which has been described is merely an example of the technique of the invention and coverage is not to be limited by such example but only by the appended claims interpreted in accordance with established rules of patent claim interpretation, including use of the doctrine of equivalents.

What is claimed is:

1. A method of forming a fatigue life enhanced dovetail connector slot in a workpiece, comprising:
    drilling a pair of spaced-apart openings in the workpiece at locations spaced about equal distances inwardly from an edge of the workpiece;
    cold-expanding the workpiece material immediately surrounding each opening by passing a cold-expansion mandrel through each opening;
    cutting the workpiece along lines extending inwardly from the edge to central regions of the cold-expanded openings;
    removing the region of the workpiece material between the two openings and the two cuts; and
    machining edge portions of the material in the vicinity of the cuts and the openings to a final desired size and shape but retaining the cold-expanded round regions bounding the slots.

2. A method according to claim 1, comprising finish machining the workpiece following formation of the connector slot.

3. A method according to claim 1, comprising cold-expanding the openings by inserting a sleeve in each opening and pulling the cold-expansion mandrel through said sleeve.

4. A method according to claim 1, comprising cold-expanding each opening by pulling a mandrel through the opening which includes an external surface that is in direct contact with the material surrounding the drilled opening.

5. A method of forming fatigue life enhanced dovetail connector slots in a peripheral portion of a rotor for receiving blade roots, comprising:
    drilling a pair of spaced-apart openings in the peripheral portion of the rotor at each blade root location, substantially equal distances inwardly from the peripheral edge of the rotor;
    cold-expanding the rotor material immediately surrounding the openings by passing a cold-expansion mandrel through each opening;
    cutting the rotor along lines extending inwardly from the edge of the rotor to central regions of the cold-expanded openings;
    removing the regions of the rotor material which are circumferentially between the two openings and the two cuts at each blade location; and
    machining edge portions of the material in the vicinity of the cuts and the openings to a final desired size and shape but retaining the cold-expanded round regions bounding the slots.

6. A method according to claim 5, comprising finish machining the rotor following formation of the dovetail connector slots.

7. A method according to claim 5, comprising coldexpanding each opening by positioning a generally tubular cold-expansion sleeve on a reduced diameter intermediate portion of the cold-expansion mandrel, said intermediate portion being axially inwardly of an increasing diameter portion, and a maximum diameter portion of said mandrel extending axially outwardly of said increasing diameter portion, and inserting the mandrel and sleeve into the opening from one side of the rotor, holding said sleeve within said opening, and retracting the mandrel through the sleeve, so that as the mandrel is retracting, the increasing and maximum diameter portions of the mandrel expand the sleeve radially to cold-expand the material immediately contacted by the sleeve and surrounding the opening.

8. A method according to claim 7, comprising finish machining the rotor following formation of the dovetail connector slots.

9. A method according to claim 5, comprising cold-expanding each opening by pulling a mandrel through the opening which includes an external surface that is in direct contact with the material surrounding the drilled openings.

10. A method of forming a noncircular opening in a workpiece which is immediately bounded by material which includes residual compressive stresses for fatigue life enhancement, said method comprising:
    drilling a plurality of at least two spaced-apart openings in the workpiece;
    cold-expanding the workpiece material immediately surrounding each opening by passing a cold-expansion mandrel through each opening;
    cutting the workpiece along lines intersecting the openings and removing a region of the workpiece material which is between the openings; and
    leaving circular portions of the cold-expanded drilled openings so that the noncircular opening which results is partially bounded by the circular region.

11. A method according to claim 9, comprising cold-expanding the drilled circular openings by inserting a sleeve in each opening and pulling the cold-expansion mandrel through said sleeve.

12. A method according to claim 10, comprising cold-expanding each drilled circular opening by pulling a mandrel through the opening which includes an external surface that is in direct contact with the material surrounding the drilled opening.

* * * * *